United States Patent [19]

Dahlberg

[11] 4,289,261

[45] Sep. 15, 1981

[54] METHOD OF THERMALLY INDUCING BENDING MOMENT FORCES TO SEVER A GLASS SHEET ALONG A SCORE

[75] Inventor: J. Robert Dahlberg, Jeannette, Pa.

[73] Assignee: PPG Industries, Inc., Pittsburgh, Pa.

[21] Appl. No.: 127,692

[22] Filed: Mar. 6, 1980

[51] Int. Cl.³ .......................... B26F 3/06; C03B 33/09
[52] U.S. Cl. ...................................... 225/2; 225/93.5; 225/96.5
[58] Field of Search .......................... 225/93.5, 2, 96.5; 65/112, 113

[56] References Cited

U.S. PATENT DOCUMENTS

| | | | |
|---|---|---|---|
| 3,520,455 | 7/1970 | Smith | 225/1 |
| 3,695,497 | 10/1972 | Dear | 225/2 |
| 3,695,498 | 10/1972 | Dear | 225/1 |
| 3,754,884 | 8/1973 | McDavid et al. | 65/97 |
| 3,756,482 | 9/1973 | DeTorre | 225/93.5 X |
| 3,795,502 | 3/1974 | DeTorre | 65/174 |
| 3,800,991 | 4/1974 | Grove et al. | 225/93.5 X |
| 4,088,255 | 5/1978 | DeTorre | 225/98 |
| 4,196,830 | 4/1980 | Oravitz, Jr. et al. | 225/93.5 X |

*Primary Examiner*—Frank T. Yost
*Attorney, Agent, or Firm*—Donald Carl Lepiane

[57] ABSTRACT

Scores imposed in a glass sheet are propagated by heating the sheet about the score to induce thermal bending moment forces about the score to sever the sheet.

5 Claims, 5 Drawing Figures

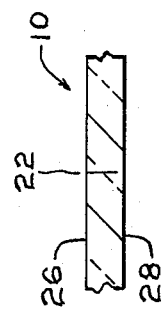
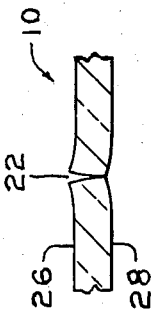
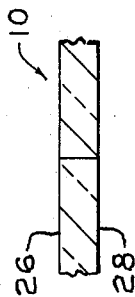
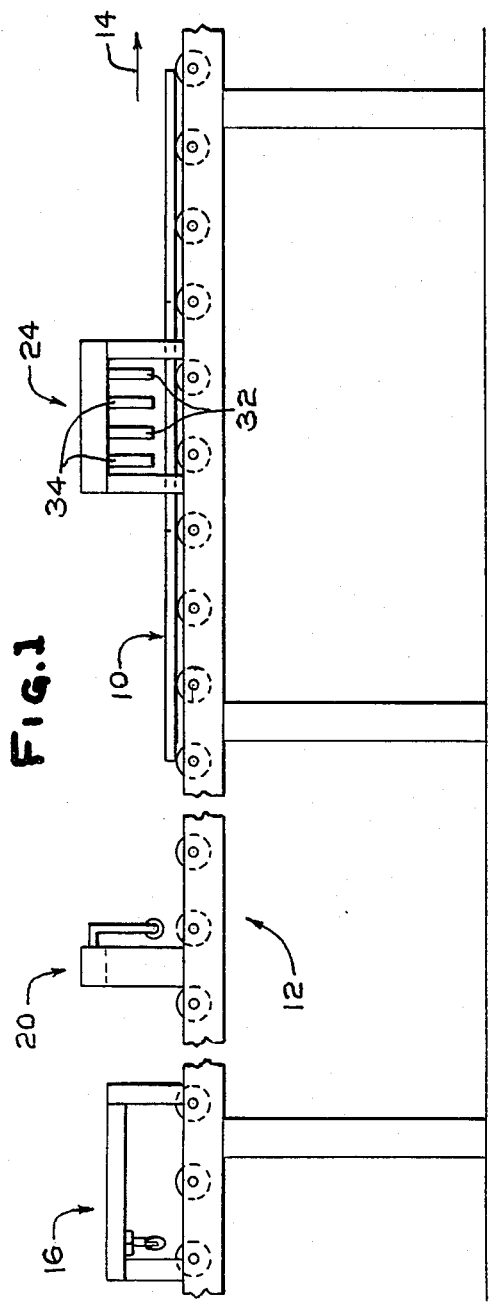
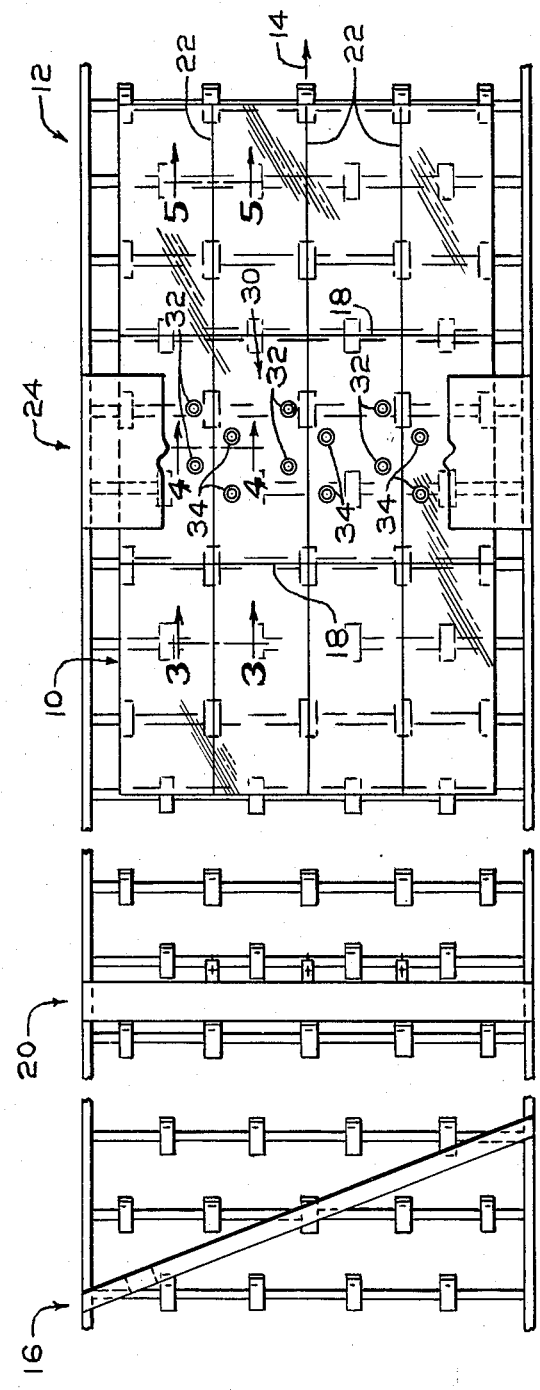

METHOD OF THERMALLY INDUCING BENDING MOMENT FORCES TO SEVER A GLASS SHEET ALONG A SCORE

BACKGROUND OF THE INVENTION

1. Field of the Invention

This invention relates to a method of and apparatus for severing a refractory material, e.g. a glass sheet along a score.

2. Discussion of the Art

There are taught in the art various techniques for severing glass sheets, e.g. in U.S. Pat. Nos. 4,088,255 and 4,136,807 members are urged against a glass sheet to apply bending moment forces about a score to sever the sheet and in U.S. Pat. Nos. 3,695,497 and 3,730,408 a heat source, e.g. a delineated infrared source and hot air heaters, respectively, are used to create a thermal score or heat path in a glass sheet afterwhich bending moment forces are applied about the heat path to sever the sheet. Although each of the techniques taught in the above-mentioned U.S. patents are acceptable there are limitations. For example a limitation of the techniques taught in U.S. Pat. Nos. 3,695,497 and 3,730,408 is the time required to concentrate the heat in the sheet to set up stress fields to create the heat path. Further, a limitation common to each of the above-mentioned techniques is that the glass sheet is contacted to apply the severing bending moment forces and this contact can mar the glass surface.

The limitations of the above techniques are not present in the technique of U.S. Pat. No. 3,695,498. In general, a delineated infrared source is positioned at one focus of an elliptical reflector to cause the energy to be concentrated in a glass piece along an intended line of fracture. The heat generates a stress field in the glass sheet sufficient to sever the sheet. The limitation of this technique is the energy required to set up the stress field and the control of the stress field to provide a fracture along a predetermined path of fracture. U.S. Pat. No. 3,754,884 teaches the severing of a glass sheet from a ribbon heated to a temperature corresponding to the strain point of the glass. Although this technique is acceptable for practice on a glass ribbon during its manufacture it is not acceptable for severing glass sheets which must be heated in order to practice the severing technique. U.S. Pat. No. 3,520,455 teaches the severing of ceramics by applying a boron nitride coating along an intended path of cut and heating the boron nitride to sever the ceramic piece. The limitation with this technique is the need of the boron nitride coating and a uniform coating thereof to provide uniform thermal stresses in the ceramic piece.

U.S. Pat. Nos. 3,756,482 and 3,795,502 each teach in one form or another, the severing of a glass sheet by imposing a score in the sheet followed by heating the score to propogate the score through the sheet to sever the sheet. The limitation of this technique is that the score is propogated through the glass by the use of heat which sets up stress fields and may result in cut edge defects. Further, if the glass sheet has scores transverse to those being propogated by the heat, the application of heat may affect the cut edge of the opened transverse scores.

As can now be appreciated, it would be advantageous to provide techniques for severing a glass sheet along a score using noncontacting bending moment forces that do not have the limitations of the above-mentioned art.

SUMMARY OF THE INVENTION

This invention relates to improving the method of severing a sheet of refractory material, e.g. a glass sheet which includes imposing a score in the sheet followed by applying bending moment forces about the score. The improvement of the instant invention includes thermally inducing beinding moment forces about the score to sever the sheet.

This invention further relates to improving apparatuses for severing the sheet of refractory material which apparatus include facilities for imposing a score in the sheet and for applying bending moment forces about the score. The improvement of the instant invention includes facilities for heating the sheet about the score to bend the sheet about the score to sever the sheet.

The instant invention is practiced by heating a surface of the sheet about the socre to establish a thermal difference between the surfaces of the sheet. This thermal difference causes the sheet to warp or bend without fracturing the sheet as illustrated in the following example. A pair of Serpentine II Hot Air Heaters positioned about ⅜ inch (0.95 centimeters) from a sheet movement path and at opposite corners of about a 1.5 inches (3.81 centimeters) by about 6 inches (0.15 meter) rectangle. Air at a rate of about 30 pounds per square inch (0.21 kilograms per square meter) was moved through each heater powered at about 17½ amperes. A glass sheet having a thickness of about 0.070 inch (0.178 centimeter) was moved along the path beneath the heaters at a speed of about 750 inches per minute (18.75 meters per minute). The centerline of the sheet portion between the heaters, i.e. centerline spaced about ¾ inch (1.91 centimeters) from adjacent heater bent upward a distance of about 0.024 inch (0.061 centimeter). After the sheet cooled it returned to its original flat condition and there were no fractures visually observed in the bent sheet portion. From the above example it is clear that the heat is only sufficient to bend the glass which in turn applies tensile forces or bending moment forces about the score to sever the sheet along the score.

Advantages of the instant invention are that (1) the sheet is not contacted during the application of the bending moment forces; (2) the cut is along a path defined by a score; and (3) less heat is required for severing the sheet as compared to the energy or heat flux required to generate a stress field in the sheet of sufficient magnitude to induce a fracture in the sheet.

BRIEF DESCRIPTION OF THE DRAWING

FIG. 1 is a side elevated view of a scoring and opening station incorporating features of the invention;

FIG. 2 is a top elevated view of the FIG. 1 having portions removed for purposes of clarity;

FIG. 3 is a view taken along lines 3—3 of FIG. 2;

FIG. 4 is a view taken along lines 4—4 of FIG. 2; and

FIG. 5 is a view taken along lines 5—5 of FIG. 2.

DESCRIPTION OF THE INVENTION

This invention relates to heating a sheet of refractory material to induce thermal bending moment forces about a score imposed in the sheet to sever the sheet along the score. In the following discussion the sheet of refractory material is a glass sheet; however, as will be appreciated the invention may be practiced on other types of refractory material, e.g. ceramics and/or glass-ceramics having a positive co-efficient of expansion.

With reference to FIGS. 1 and 2 glass sheet 10 is conveniently advanced by conveyor 12 along a movement path in the direction of the arrow designated by the numeral 14 through a first scoring station 16 to impose cross or lateral scores 18 in the sheet, through a second scoring station 20 to impose slit or longitudinal scores 22 in the sheet and through severing station 24 incorporating features of the invention for opening the slit scores 22 to sever the sheet. the type of conveyor for advancing the sheet 10 is not limiting to the invention and the roll conveyor 12 shown in FIGS. 1 and 2 is presented to illustrate one type of conveyor that may be used in the practice of the invention. The technique and apparatus for imposing the lateral scores 18 and the longitudinal socres 22 in the glass sheet are not limiting to the invention and any convenient apparatus may be used. For example, the scoring apparatuses taught in U.S. Pat. No. 4,137,803 may be used in the practice of the invention and the teachings therein and hereby incorporated by reference.

The score imposed in the glass sheet to be propogated by thermal bending moment forces, e.g. slit scores 22 is a fracture having a depth of about 80 percent of the sheet thickness. The score 22 is preferably imposed in the sheet to minimize cut edge damage. A technique that may be employed, but not limiting thereto, is to impose a score into the tension zone of the sheet having a sufficient depth to interact with the compression zone to propogate the score through the tension zone to the opposite compression zone. In glass it is generally accepted that an internal tension zone, approximately 60% of the glass thickness is between a pair of outer compression zones each approximately 20% of the glass thickness. It is preferred that the scores 22 terminate short of the opposite compression zone so that the sheet will not be uncontrollably severed as it advances along the conveyor 12. A score of the above type is taught in U.S. Pat. No. 3,756,482 which teachings are hereby incorporated by reference.

Referring now to FIGS. 2–5, as the sheet 10 moves through the severing station 24, surface 26 of the sheet on each side of the score is heated in any convenient manner e.g. by a hot air heater or resistant heater. One surface of the sheet is heated to establish a thermal difference between sheet surfaces 26 and 28 which raises, bends or warps sheet portions about the score 22 as shown in FIG. 4. As the sheet warps, the tensile forces about the score 22 are increased to propogate the score 22 through the sheet 10 to the opposite surface 28 to sever the sheet. Upon cooling, the sheet returns to its original preheated flat condition as shown in FIG. 5.

The magnitude of the thermal bending moment forces required to open the score 22 are considered to be a function of the sheet thickness and score depth. As the sheet thickness increases while the score depth remains constant, the bending moment forces required to propogate the score increase and vice versa. As the score depth increases while the sheet thickness remains constant, the bending moment forces required to propogate the score decrease and vice versa. Preferably in the practice of the invention the sheet has a thickness of about 0.120 inch (3.05 millimeters) or less in order that the thermal bending moment forces applied to the sheet bend the sheet without adversely affecting the sheet. For example, as the sheet thickness increases the sheet becomes rigid to such a degree that the thermal energy required to bend the sheet becomes so great that it may adversely affect the internal stresses of the sheet.

In general, the thermal bending moment forces are a function of heat flux applied about the score and the heat flux is a function of the spaced distance between the heat source and the sheet, the spaced distance between the heat source and the score, the heat output of the heat source and the speed of the sheet. As the distance between the heat source and the sheet increases while the remaining parameters are kept constant, the magnitude of the thermal bending moment forces decrease and vice versa; as the distance between the heat source and the score increases while the remaining parameters are kept constant the magnitude of the thermal bending moment forces decrease and vice versa; as the heat output of the heat source increases while the remaining parameters are kept constant, the magnitude of the thermal bending moment forces increases and vice versa and as the speed of the sheet increases while the remaining parameters are kept constant, the magnitude of the thermal bending moment forces decreases and vice versa.

DETAILED DESCRIPTION OF THE INVENTION

With reference to FIGS. 1 and 2, a glass sheet 10 having a width of about 4 feet (1.2 meters) and a length of about 9 feet (2.7 meters) as measured between leading and trailing edge of the advancing sheet and a thickness of about 0.120 inch (3.05 millimeters) advances through the first and second scoring stations 16 and 20 respectively. At the first scoring station a pair of lateral scores 18 on a center to center spacing of about 3 feet (0.9 meters) are imposed in the sheet. Each of the scores 18 having a depth of about 0.005 inch (0.13 milimeters) are imposed in the sheet by a scoring wheel having a diameter of about $\frac{1}{4}$ inch (0.64 centimeter), an apex scoring angle of about 130° urged under a force of about 3.5 pounds (1.59 kilograms) against the sheet moving at a speed of about 750 inches/minute (18.75 meters/minute). At the second scoring station three slit scores 22 on a center to center spacing of about 1 foot (0.3 meters) are imposed in the sheet. The slit scores 22 each having a depth of about 0.096 inch (2.4 millimeters) are imposed by a scoring wheel having a diameter of about 0.100 inch (2.5 millimeters) an apex scoring angle of about 150° urged under a scoring force of about 8 pounds (3.6 kilograms) against the sheet advancing at a speed of about 750 inches per minute (18.75 meters per minute). The initial depth of the scores 22 is about between 0.019 and 0.024 inch (0.47–0.60 millimeters) and has a final depth after interacting with the tension zone of about 0.096 inch (2.4 millimeters).

With specific reference to FIG. 2, mounted at the severing station 24 are three sets of hot air heaters 30 of the type sold by GTE Sylvania Co. for thermally inducing bending moment forces about the scores 22. Each heater set 30 includes a first pair of heaters 32 positioned on one side of its respective score 22 and a second pair of heaters 34 positioned on the other side. The heaters 32 are on a center to center spacing of about 5 inches (12.7 centimeters) as are the heaters 34. The heaters 32 and 34 are offset from one another as shown in FIG. 2 and spaced about $\frac{1}{4}$ inch (6.4 millimeters) from the glass surface at a position spaced about 1 inch (2.54 centimeters) from their respective score. Compressed air moving through each heater at about 40 standard cubic feet per hour (1.08 standard cubic meters per hour) has an exit temperature of about 950° F. (510° C.) and a thermal output of about 2000 watts to heat the sheet surface 26.

The heated surface portions of the sheet about the score 22 bend the sheet upward as shown in FIG. 4. As the sheet portions about the scores bend upward the scores 22 propogate to the opposite sheet surface 28 to sever the sheet. Upon cooling the sheet returns to its flat preheated condition as shown in FIG. 5.

The cross scores 18 may be opened in a similar manner as slit scores 22 or in the manner taught in U.S. Pat. No. 4,008,255 which teachings are hereby incorporated by reference.

As can now be appreciated the invention is not limited to the above example which is presented for illustration purposes only. Further, the invention may be practiced by moving the heaters relative to a stationary sheet or simultaneously moving the sheet and heaters.

What is claimed is:

1. A method of severing a sheet of refractory material having a thickness of less than about 0.120 inches (0.305 centimeters) comprising the steps of:

contacting a surface of the sheet with scoring means to define a contacted sheet surface and to impose a score in the sheet having a depth of at least about 80% of the sheet thickness; and heating portions of the contacted sheet surface on each side of the score to a temperature greater than the temperature of the opposite sheet surface to thermally induce bending moment forces about the score to sever the sheet along the score.

2. The method as set forth in claim 1 wherein said heating step is accomplished by directing heated air streams at portions of the contacted sheet surface.

3. The method as set forth in claim 2 further including the step of moving the sheet and air streams relative to one another.

4. The method as set forth in claim 1, 2 or 3 wherein the sheet is a glass sheet.

5. The method as set forth in claim 4 wherein the thermally induced bending moment forces are established by air heaters having air streams heated to a temperature of about 950° F. (510° C.).

* * * * *